Dec. 18, 1934.  J. A. JENSEN  1,985,207
VALVE CONTROL MECHANISM FOR TANK VEHICLES
Filed Sept. 28, 1932  4 Sheets-Sheet 1
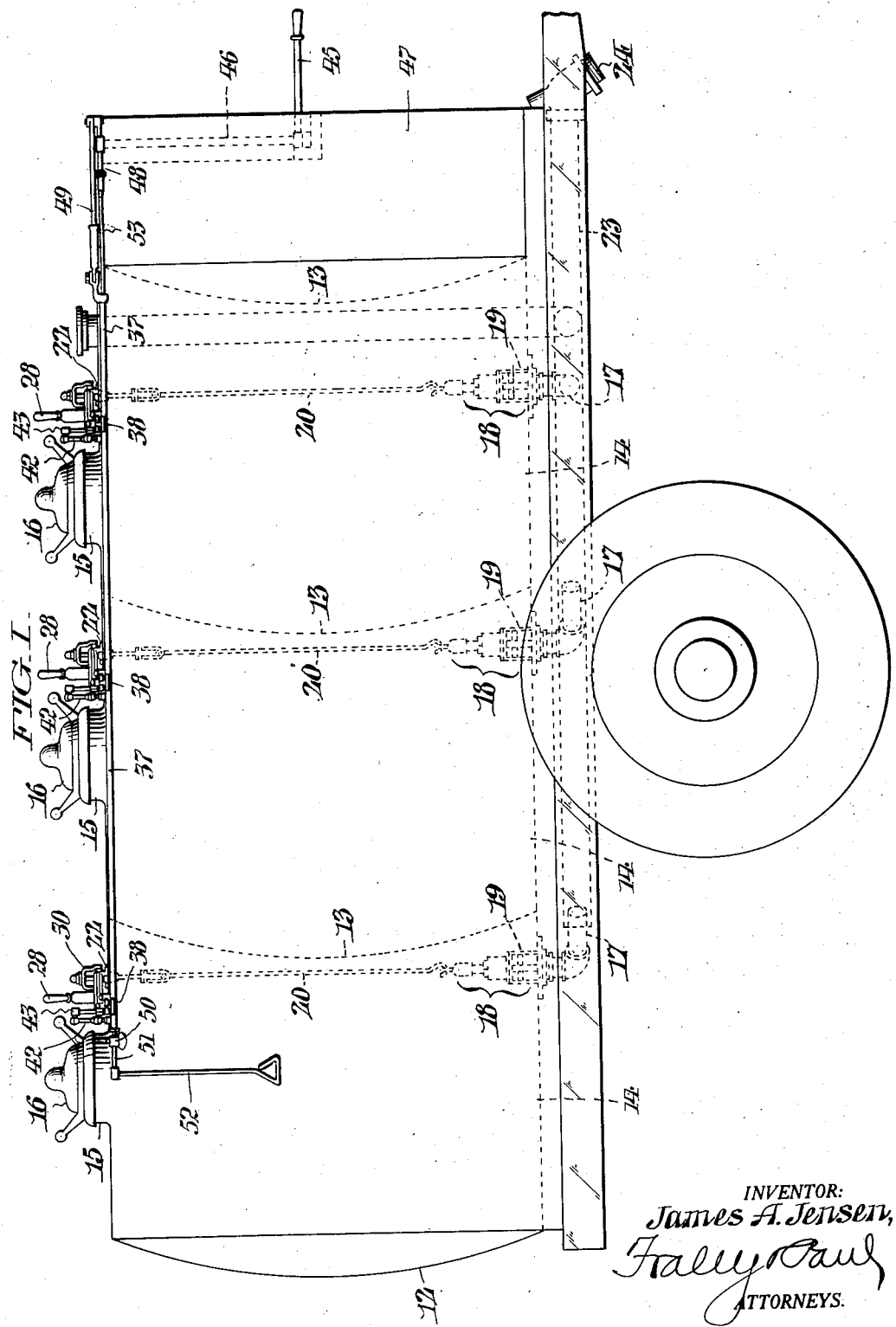
INVENTOR:
James A. Jensen,
ATTORNEYS.

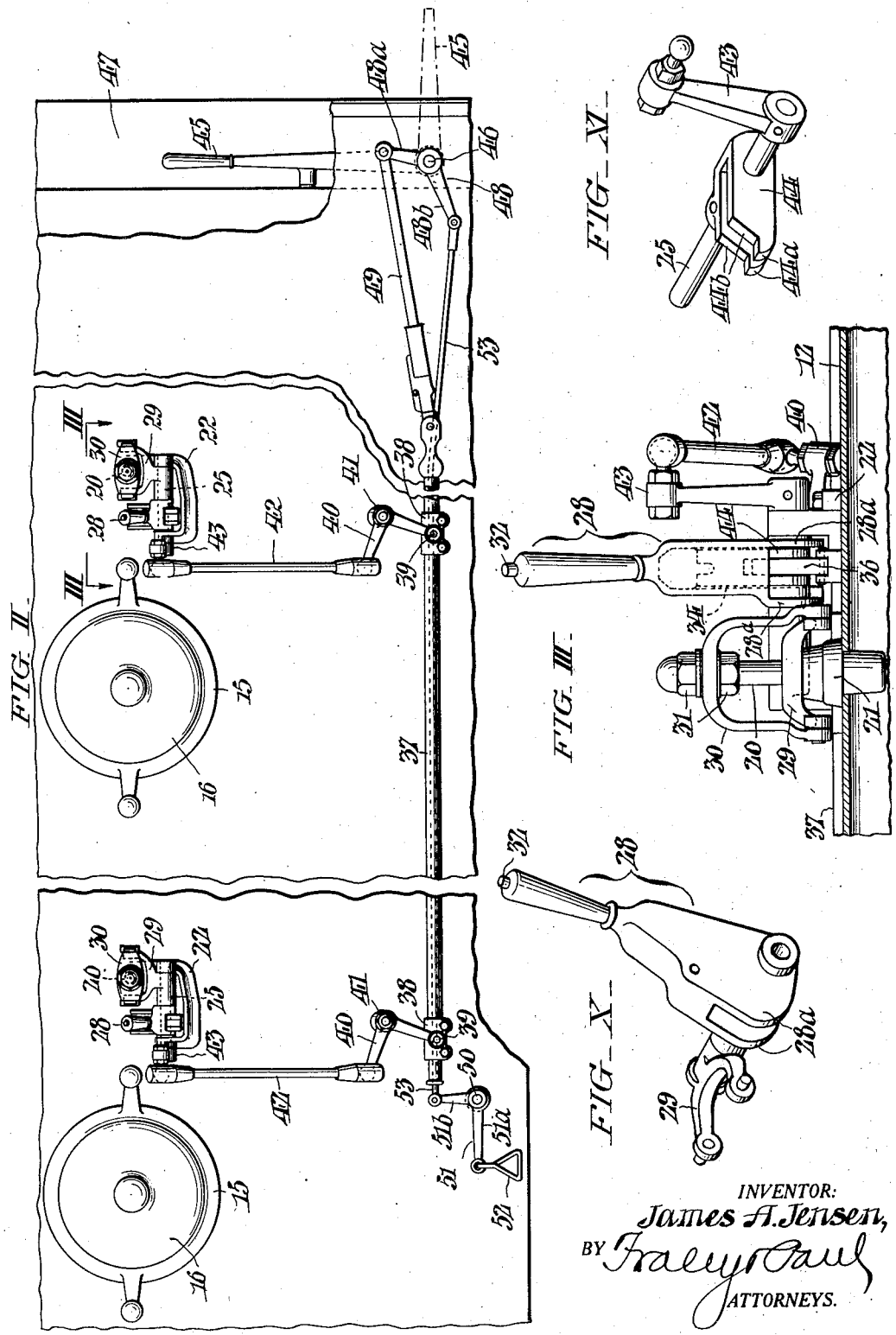

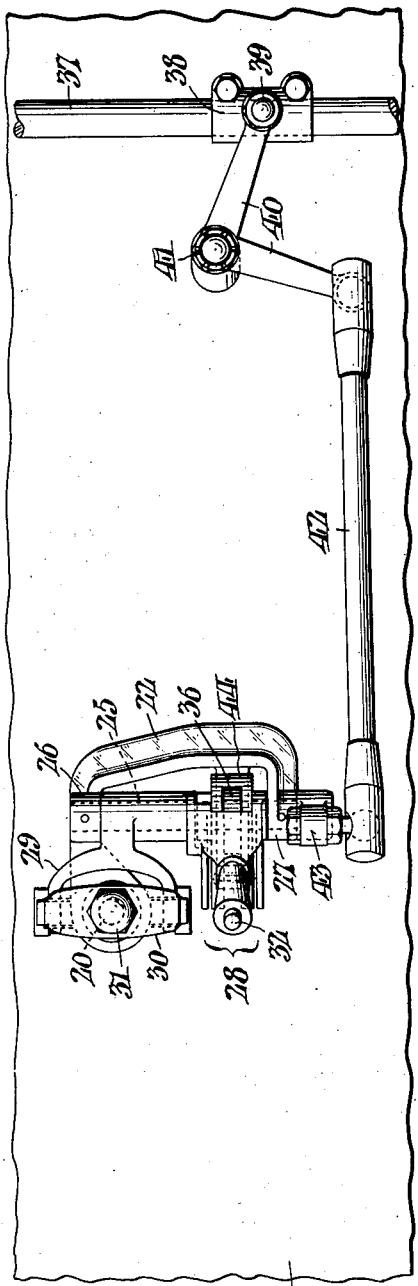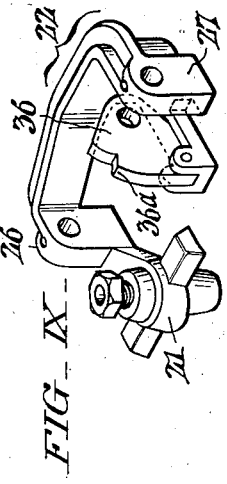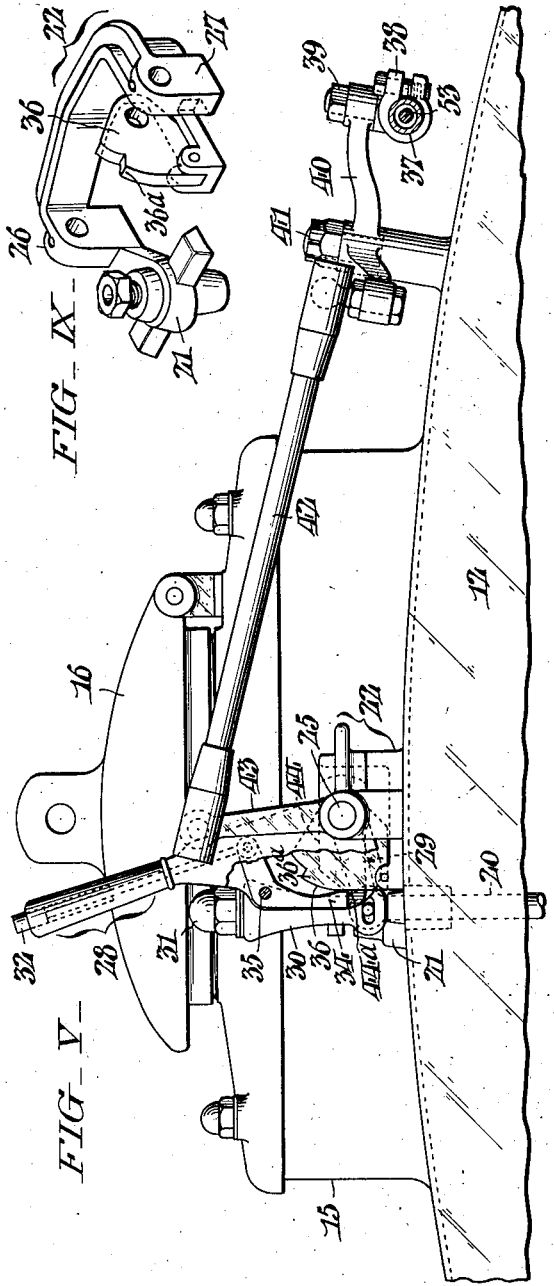

Dec. 18, 1934.  J. A. JENSEN  1,985,207
VALVE CONTROL MECHANISM FOR TANK VEHICLES
Filed Sept. 28, 1932  4 Sheets-Sheet 4
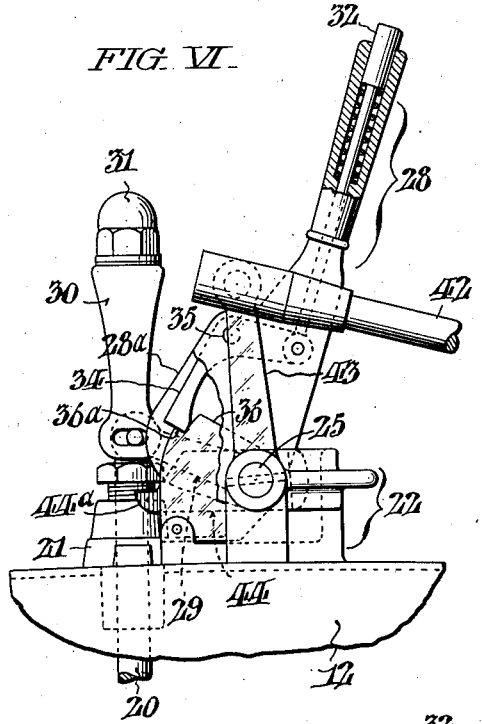
FIG. VI.
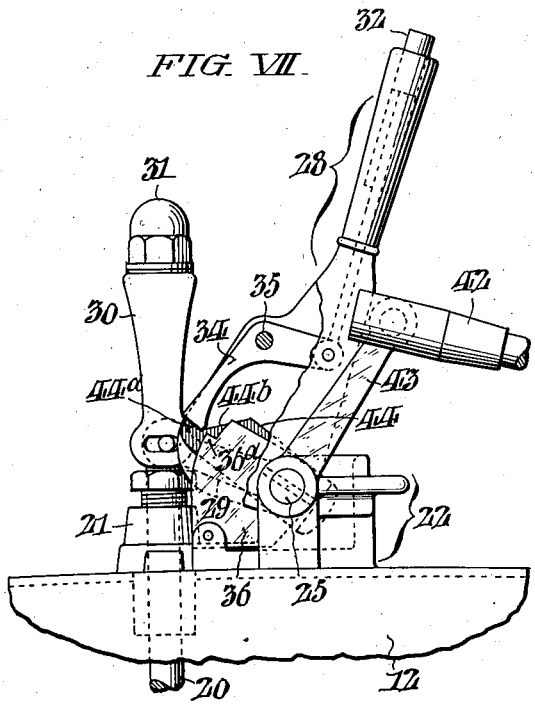
FIG. VII.
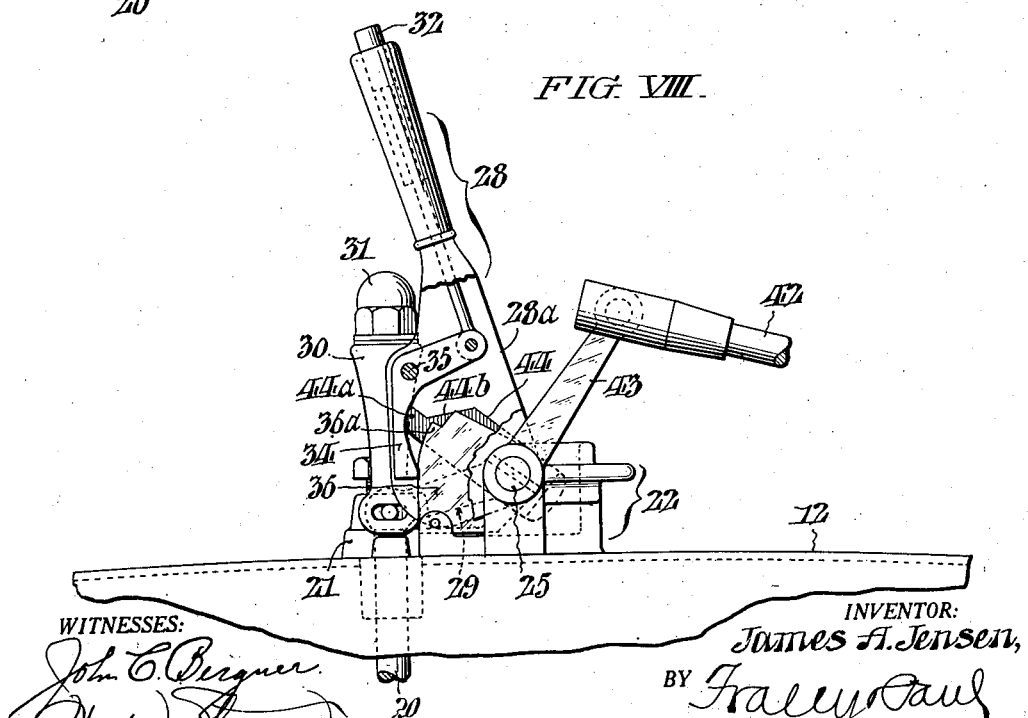
FIG. VIII.
WITNESSES:
INVENTOR:
James A. Jensen,
BY
ATTORNEYS.

Patented Dec. 18, 1934

1,985,207

UNITED STATES PATENT OFFICE 1,985,207

VALVE CONTROL MECHANISM FOR TANK VEHICLES

James A. Jensen, Philadelphia, Pa., assignor to Quaker City Iron Works, Philadelphia, Pa., a corporation of Pennsylvania Application September 28, 1932, Serial No. 635,172

11 Claims. (Cl. 137—21)

This invention relates to valve control mechanism such as typified in U. S. Patent No. 1,626,283 granted to me on April 26, 1927, and useful more particularly in connection with multi-compartment tanks of vehicles such as are employed in the transportation of gasoline and similar commodities, to operate emergency valves at the bottoms of the several tank compartments. The patented system enables opening or closing of the valves simultaneously from opposite ends of the tank; and embodies individual drain pipes with separate faucets whereby the tank compartments can be individually drained.

The chief aims of my present invention are to make it possible to dispense with the multiple drain pipes heretofore necessary, by substitution therefor of a single drain pipe or manifold with a connection to each of the compartments; and to incorporate in the control mechanism, means whereby the several valves may be operated independently. Accordingly, my improved control system permits simultaneous opening of the valves, and charging of the tank through the common drain outlet with minimization of turbulence and vaporization losses due thereto; as well as closing of the valves individually as the corresponding compartments become filled. Then again, incident to dispensing the fluid commodities subsequently, the valves may be either simultaneously opened to discharge the tank contents as a whole; or they may be individually operated so that any of the compartments can be drained independently of the others.

Still other objects and attendant advantages of this invention will be manifest from the detailed description following of the attached drawings, wherein Fig. I is a fragmentary view in side elevation, showing a tank vehicle embodying my novel valve control mechanism.

Fig. II is a fragmentary plan view of the organization drawn to a larger scale.

Fig. III is a fragmentary detail sectional view drawn to a still larger scale, taken as indicated by the arrows III—III in Fig. II, and showing the actuating connections for one of the valves.

Fig. IV is a fragmentary view in plan of the parts shown in Fig. III.

Fig. V is a fragmentary elevation of the parts shown in Figs. III and IV, looking from the bottom of the latter figure.

Figs. VI, VII and VIII are views corresponding to Fig. V showing the valve actuating parts in different positions incident to filling and draining the tank; and, Figs. IX, X and XI are detail perspective views of certain parts of the valve control mechanism.

With reference first more especially to Figs. I and II of the drawings, the numeral 12 designates the tank of the vehicle which is subdivided by bulk-heads 13 into a number of individual compartments 14, each provided at the top with a man-hole 15 which is protected by a removable cover 16 as is common in tank structures of this sort. As shown, each compartment 13 moreover has a bottom outlet 17 governed by an emergency valve 18 of a suitable design to open against the pressure of a spring 19, by upward pull on a rod 20 extending up through a stuffing box 21 afforded by a bracket 22 at the top of the tank 12. In the present instance, the outlets 17 of the several tank compartments 14 connect with a longitudinal drain pipe or manifold 23, which, at the rear end of the vehicle, is fitted with a faucet 24.

The novel control mechanism with which this invention is directly concerned, comprises a series of actuating shafts 25, one for each drain valve 18, each such shaft being rotatably journalled and supported longitudinally of the tank 12 as shown in Figs. III and IV, in end bearings 26 and 27 of a bracket of the group 22 aforementioned. Mounted for free swinging movement on each shaft 25 between the bearings 26 and 27 is a hand lever 28 with an integrally formed yoke arm 29 (Fig. X) whereof the extremities are pivotally connected to the depending extremities of a yoke head 30 adjustably clamped between a pair of nuts 31 on the threaded upper end of the stem 20 of the corresponding valve 18. As shown in Fig. VI, the handle of the hand lever 28 is made axially hollow for the guidance of a spring-pressed push rod 32. The inner end of this push rod 32, it will be noted, is connected with a detent 34 which is disposed between the side cheeks 28a of the hand lever 28, and has its pivotal center at 35. The detent 34 just referred to is adapted to cooperate with the tooth 36a of a sector piece 36 secured to the bracket 22 as shown in Fig. IX. With the described arrangement, any one of the valves 18 can obviously be opened to the exclusion of the others, simply by pushing its hand lever 28 over from the normal position of Fig. V to the position of Fig. VI, with attendant opening of the corresponding valve 18 by the yoke arm 29. Incident to such movement of the hand lever 28, the detent 34 will, under the action of the spring influencing the push rod 32 in said hand lever, ride over the tooth 36a of the sector piece 36 and finally engage said tooth so that the corresponding valve 18 is temporarily locked in open position against the pressure of the spring 19 which tends to normally hold it closed. To shut the drain valve 18, opened as just explained, the operative merely presses the projecting end of the push rod 32 in the hand lever 28 to release the detent 34 from the tooth 36a on the sector piece 36, and then pulls said hand lever back to the normal position shown in Fig. V.

The mechanism relied upon to operate the valves 16 simultaneously is generally like that of the patent supra in that its comprises a hollow tubular thrust rod 37 which extends longitudinally of the top of the tank 12. Suitably spaced along and clamped to the thrust rod 37 is a series of collars 38 corresponding in number to the drain valves 18. As shown in Figs. IV and V, these collars 38 have pivotal connection at 39 with bell crank levers 40 which are fulcrumed to swing about fixed pivots 41, and which are coupled, by means of link rods 42 with arms 43 secured respectively to the ends of the shafts 25, see Figs. IV and V. Also secured to the shafts 25 in the interval between the cheeks 28a of the hand levers 28 and lapping the opposite sides of the fixed sector pieces 36 are clevised members 44 (Fig. XI) having teeth 44a on their extremities which project beyond the curved edges of said sector pieces and under-reach the ends of the detents 34, as shown in Fig. V. As illustrated, the thrust rod 37 is operable from either end of the tank 12. The means for this purpose includes a handle 45 which is secured to a vertical shaft 46 with journal support in suitable bearings (not shown) in a supplemental box compartment 47 at the rear end of the tank 12. To the upper end of the shaft 46 is secured a double arm 48 whereof one extremity 48a is coordinated, through the medium of a link rod 49, with one end of the thrust rod 37. Fulcrumed at 50 near the forward end of the tank 12 is a bell crank lever 51 to one extremity 51a of which is attached an operating handle 52, while the other extremity 51b has secured to it one end of a cable 53 which extends rearward through the hollow of the thrust rod 37, the other end of said cable being connected to the second extremity 48b of the double arm 48 previously referred to. By swinging the handle 45 at the rear end of the vehicle from the full line position of Fig. II to that indicated in dot-and-dash lines, i. e. through an angle of 90°, the thrust rod 37 will be drawn rightward in Figs. I and II. As a consequence, movement is imparted through the bell cranks 40 and link rods 42, to the levers 43, and the imparted motion is in each instance communicated, by coaction between the teeth 44a of the elements 44 on the shafts 25, with the detents 34, to the hand levers 28 with attendant rotation of the shafts 25 to open the valves 18. The valves 18 may be closed subsequently either by swinging back the lever 45 at the aft end of the vehicle to its original full line position of Fig. II, or by drawing upon the handle 52 at the forward end of the vehicle in exactly the same manner as described in my patent aforementioned. In the event that one of the valves 18 has been previously opened by manipulation of its hand lever 28, such valve will not be disturbed during simultaneous opening of the other valves; but such previously opened valve will be closed concurrently with the others when the system is operated by either of the handles 45 or 52. Such closure of the previously opened individual valves is accomplished through the influence of sloping cam surfaces 44b on the elements 44 with the detents 34. This action will be best understood from Fig. VII where the hand lever 28 is shown as having been moved clockwise to lock the valve in open position, and the lever 43 moved afterwards from its normal position (also clockwise) incident to opening of the remaining valves simultaneously as above explained. During this movement of the lever 43 the cam surface 44b caused the detent 34 to be thrust outward from engagement with the fixed tooth 36a of the sector piece 36, so that the end of said detent finally rests against the teeth 44a of the element 44 clear of the fixed tooth 36a as shown. Accordingly, when the link rod 42 is subsequently shifted leftward the detent 34 swings past the fixed tooth 36a as the arm 43 is moved by the thrust rod 37 until the parts finally re-assume the normal position shown in Fig. V with attendant closing of the valve 18 which was independently opened previously.

On the other hand, with all the valves 18 open, any one of them may be closed independently of the others simply by pressing the push rod 32 of its actuating lever 28 in Fig. VII, to release the detent 34 from the tooth projections 44a on the element 44 and swinging said lever over to the normal position as in Fig. VIII. When the balance of the valves are subsequently closed by either of the handles 45, 52, the teeth 44a on element 44 will travel past the detent 34 and allow the spring in handle 28 to pull said detent into the normal position shown in Fig. V with its lower end engaging the teeth 44a in readiness for the next cycle of operations.

In initially filling the tank by way of the drain pipe 23, my novel control mechanism is operated as follows: The valves 18 are simultaneously opened by means of the handle 45, and as each compartment 14 of the tank fills up, the corresponding valve is shut by means of its hand lever 28, so that, in this way, the filling operation is expedited with minimum turbulence and a negligible loss of the gasoline through evaporation.

For discharge of the gasoline when bulk deliveries are to be made, the valves 18 are simultaneously opened by swinging the lever 45 so that the several compartments 14 of the tank may drain concurrently through the pipe 23. When lesser quantities are to be discharged, one or more of the valves 18 are opened as required by means of their individual hand levers 28.

Having thus described my invention, I claim:

1. In combination, a vehicle tank with a multiplicity of compartments having separate drain valves; and control mechanism comprising leverage means whereby any one or more of the drain valves can be opened exclusive of the others; and leverage means whereby said other valves can be simultaneously opened and closed independently of the operating of the first mentioned valve or valves.

2. In combination, a vehicle tank with a multiplicity of compartments having separate drain valves and control mechanism comprising leverage means whereby any one or more of the drain valves can be independently opened and temporarily so held exclusive of the others, and leverage means whereby said other valves can be simultaneously opened, and whereby the latter valves, as well as any previously locked open valve or valves can be simultaneously closed subsequently.

3. In combination, a vehicle tank with a multiplicity of compartments having separate drain valves, and control mechanism comprising means whereby one or more of the drain valves can be opened exclusive of the others, including means to temporarily lock such valve or valves in open position, and means whereby the remaining valves can be simultaneously opened with incidental tripping of the locking means of the previously opened valves so that such previously opened valves can be closed concurrently with the others.

4. In combination, a vehicle tank with a multiplicity of compartments having separate drain valves; and control mechanism comprising a hand lever for each valve whereby the valve can be opened independently of the others, and a fixed stop to cooperate with a releasable detent on the hand lever to lock such valve in open position and separate means adapted for concurrent cooperation with the detents on the other hand levers whereby the remaining valves can be simultaneously opened.

5. In combination, a vehicle tank with a multiplicity of compartments having separate drain valves; and control mechanism comprising a hand lever for each valve whereby the valve can be opened exclusive of the others, and a fixed stop to cooperate with a releasable detent on the lever to temporarily lock the valve in open position and separate means adapted for concurrent cooperation with the detents on the other hand levers to simultaneously open the remaining valves and for incidently withdrawing the detent of a previously opened valve from the fixed stop so that said valve can be subsequently closed concurrently with the others.

6. In combination, a vehicle tank with a multiplicity of compartments having individual drain valves, and control mechanism comprising for each valve, a shaft and a loosely mounted hand lever whereby the valve can be opened or closed exclusive of the others and a fixed stop to cooperate with a releasable detent on the hand lever to temporarily hold the valve in open position, and separate means including a thrust rod coordinated with arms fast on the respective valve shafts and elements also fast on the shafts having projections for engaging the detents on the hand levers, whereby the valves can be simultaneously opened by movement of the thrust rod in one direction, each of said elements being formed with cam surfaces adapted, when the corresponding valve has been previously opened as aforesaid, to dislodge the detent from its fixed stop so that such previously opened valve can be closed concurrently with the others by moving the thrust rod in the opposite direction.

7. In combination, a vehicle tank with a multiplicity of compartments; a drain pipe connected with outlets leading from the several compartments; a separate drain valve for each such outlet; and control mechanism including means whereby the aforesaid valves may be simultaneously opened incident to charging of the tank through the drain pipe, said means being maintained in operation during filling of the several tank compartments, and means whereby the individual valves may be closed as the corresponding tank compartments become filled.

8. In combination, a vehicle tank with a multiplicity of compartments having individual drain valves; and control mechanism including a master actuating means common to all the valves, and means local to the valves whereby the same can be opened or closed individually, and whereby said valves can be selectively coupled to the master means for actuation singly or in groups from a remote point.

9. In combination, a vehicle tank with a multiplicity of compartments having separate drain valves at the bottom operable by individual connections extending up through the tank; and control mechanism including a master actuating means common to all the valves, and means local to the valve connections aforesaid above the tank whereby the valves can be opened or closed individually, and whereby the valves can be selectively coupled to the master means aforesaid for actuation individually or in groups from a remote point.

10. In combination, a vehicle tank with a multiplicity of serially arranged compartments with individual drain valves; and control mechanism including a master means common to all of the valves, and means local to the valves whereby said valves can be opened or closed individually, and whereby they can be coupled with the master means for actuation individually or in groups from a remote point.

11. In combination, a vehicle tank with a multiplicity of serially arranged compartments having individual valves to govern bottom outlets; a longitudinal drain manifold beneath the tank common to said outlets; and control mechanism including a master actuating means common to all the valves, and means local to said valves whereby said valves can be independently opened and closed, and whereby they may be selectively coupled for actuation by the master means individually or in groups from a remote point for discharge of the tank compartments through the corresponding bottom outlets into the common drain manifold.

JAMES A. JENSEN.